United States Patent
Yamamoto et al.

(10) Patent No.: US 8,988,799 B1
(45) Date of Patent: Mar. 24, 2015

(54) MAGNETIC DISK DEVICE AND CONTROL METHOD OF MAGNETIC DISK

(71) Applicant: Kabushiki Kaisha Toshiba, Tokyo (JP)

(72) Inventors: Michio Yamamoto, Inagi (JP); Takumi Kakuya, Ebina (JP); Tetsuo Kuribayashi, Yokohama (JP); Kenji Inoue, Kamakura (JP); Hironori Kanno, Fussa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 14/308,460

(22) Filed: Jun. 18, 2014

Related U.S. Application Data

(60) Provisional application No. 61/948,228, filed on Mar. 5, 2014.

(51) Int. Cl.
*G11B 27/36* (2006.01)
*G11B 5/012* (2006.01)

(52) U.S. Cl.
CPC ............... *G11B 27/36* (2013.01); *G11B 5/012* (2013.01)
USPC .............................................. 360/31; 360/53

(58) Field of Classification Search
None
See application file for complete search history.

(56) References Cited

U.S. PATENT DOCUMENTS

| | | | |
|---|---|---|---|
| 6,882,489 B1* | 4/2005 | Brunnett et al. | 360/75 |
| 7,215,497 B2 | 5/2007 | Urata | |
| 7,245,447 B2 | 7/2007 | Zaitsu | |
| 2007/0253096 A1* | 11/2007 | Alfred et al. | 360/78.04 |
| 2009/0086366 A1* | 4/2009 | Ehrlich | 360/78.04 |
| 2009/0268336 A1* | 10/2009 | Ogawa | 360/75 |
| 2010/0321817 A1 | 12/2010 | Aida et al. | |
| 2012/0300341 A1* | 11/2012 | Matsuo et al. | 360/77.02 |
| 2013/0027800 A1* | 1/2013 | Park et al. | 360/31 |
| 2013/0194699 A1 | 8/2013 | Matsuo et al. | |

FOREIGN PATENT DOCUMENTS

| | | |
|---|---|---|
| JP | 2003-331403 | 11/2003 |
| JP | 2004-303303 | 10/2004 |
| JP | 2011-008842 | 1/2011 |
| JP | 2013-157067 | 8/2013 |

* cited by examiner

*Primary Examiner* — Thang Tran
(74) *Attorney, Agent, or Firm* — Knobbe Martens Olson & Bear LLP

(57) ABSTRACT

According to one embodiment, any of a first process to perform a write retry to a write target track, a second process to perform the write retry and perform reading for data verification to an adjacent track, and a third process to perform the write retry and write data of the adjacent track to another track is executed based on a result of comparison between an offtrack amount and a plurality of different slice values.

17 Claims, 6 Drawing Sheets

FIG.4

| OFFTRACK LEVEL | RETRY PROCESS |
|---|---|
| NORMAL | NONE |
| SLIGHT | WRITE RETRY |
| MODERATE | WRITE RETRY, VERIFICATION READ OF ADJACENT TRACK |
| SEVERE | EXECUTE WRITE RETRY, WRITE DATA OF ADJACENT TRACK TO ANOTHER TRACK |

| TRACK GROUP | ATI COUNT |
|---|---|
| GROUP 0 | 500 |
| GROUP 1 | 700 |
| GROUP 2 | 900 |
| ... | ... |

| OFFTRACK LEVEL | ATI COUNT PROCESS |
|---|---|
| NORMAL | ADDITION MULTIPLYING FACTOR=1 |
| SLIGHT | ADDITION MULTIPLYING FACTOR=A |
| MODERATE | ADDITION MULTIPLYING FACTOR=B  B=B1, B2, B3 |
| SEVERE | ADDITION MULTIPLYING FACTOR=C |

$1<A<B<C$
$B1<B2<B3$

MAGNETIC DISK DEVICE AND CONTROL METHOD OF MAGNETIC DISK

CROSS-REFERENCE TO RELATED APPLICATIONS

This application is based upon and claims the benefit of priority from U.S. Provisional Patent Application No. 61/948,228, filed on Mar. 5, 2014; the entire contents of which are incorporated herein by reference.

FIELD

This embodiment generally relates to a magnetic disk device provided with a magnetic disk and a control method of the magnetic disk.

BACKGROUND

In a higher-capacity hard disk drive (HDD), a track pitch becomes narrower and it becomes difficult to maintain a uniform track pitch and track pitch abnormality in which the track pitch becomes narrower than a reference track pitch might occur. The track pitch abnormality might have effects of (I) occurring close writing to an adjacent track and (II) adjacent track interference (ATI) on the HDD becomes large.

Measures against the close writing or measures against the ATI are based on a constant track pitch, and the track pitch abnormality is not taken into consideration. Therefore, the measures against the close writing or the measures against the adjacent track interference in which the track pitch abnormality is taken into consideration are required.

BRIEF DESCRIPTION OF THE DRAWINGS

FIG. 4 is a view of a correspondence relationship between an offtrack level and a retry process;

FIG. 5 is a view of an example of an ATI management table;

FIG. 6 is a view of a correspondence relationship between the offtrack level and an ATI count process;

DETAILED DESCRIPTION

In general, according to one embodiment, a magnetic disk device is provided with a magnetic head, a magnetic disk corresponding to the magnetic head, and a controller configured to write data to the magnetic disk with the magnetic head. The controller detects an amount of offtrack occurring at the time of writing to a write target track and executes any of first, second, and third processes based on a result of comparison between the detected offtrack amount and a plurality of different slice values. In the first process, a write retry is performed to the write target track. In the second process, the write retry is performed to the write target track and reading for data verification is performed to an adjacent track adjacent to a side on which the offtrack occurs at the time of the writing to the write target track. In the third process, the write retry is performed to the write target track and the data of the adjacent track is written to another track.

Exemplary embodiments of the magnetic disk device and a control method of the magnetic disk will be explained below in detail with reference to the accompanying drawings. The present invention is not limited to the following embodiments.

First Embodiment

Figure 1:
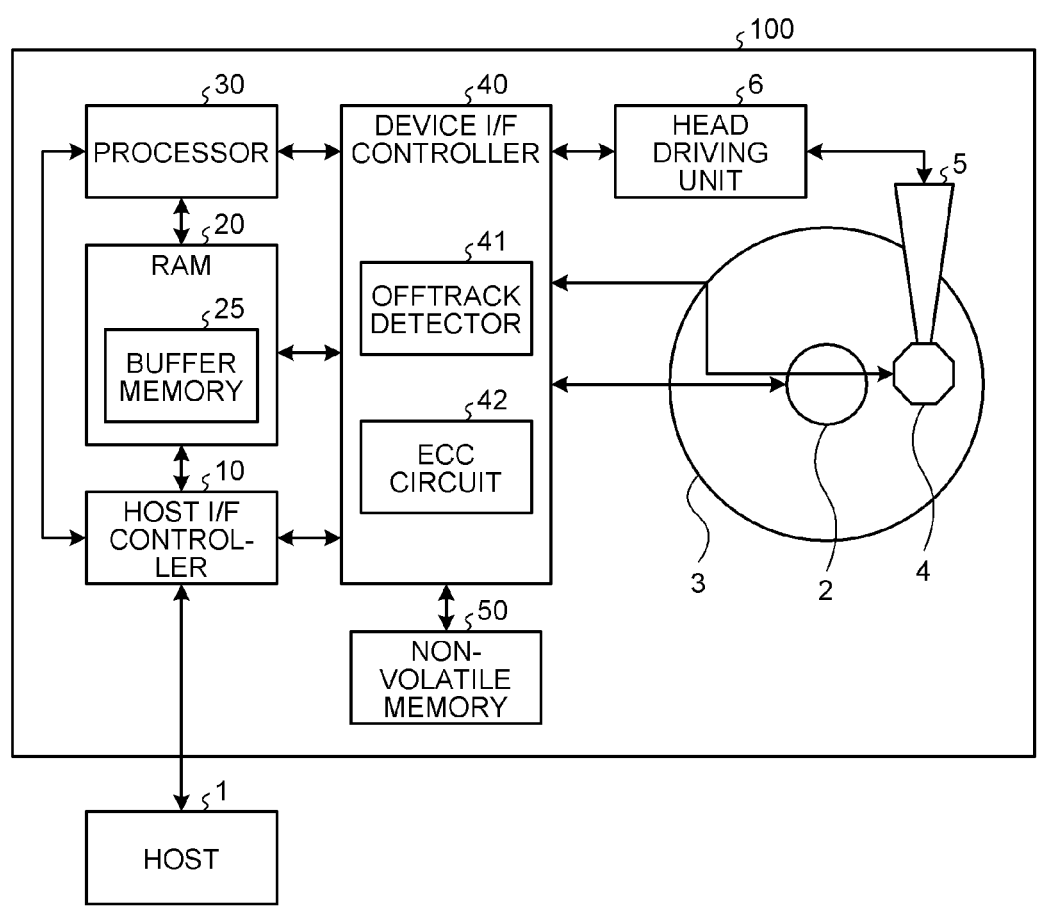
FIG. 1 is a functional block diagram of an internal configuration of a magnetic disk device.

FIG. 1 illustrates a configuration example of a magnetic disk device 100 according to a first embodiment. The magnetic disk device 100 known as a hard disk drive (HDD) is connected to a host device (hereinafter, abbreviated as a host) 1 and serves as an external storage device of the host 1.

The magnetic disk device 100 includes a magnetic disk 3 being a recording medium rotated by a spindle motor 2. The magnetic disk device 100 includes a head actuator 5 driven by a head driving unit 6. A magnetic head 4 for writing and reading is attached to a tip end of the head actuator 5.

The magnetic disk device 100 includes a host interface controller (host I/F controller) 10, a RAM 20, a processor 30, a device interface controller (device I/F controller) 40, and a non-volatile memory 50 as a control system.

The host I/F controller 10 executes communication of a command, data, a status report and the like with the host 1. When the host I/F controller 10 receives the command from the host 1, the host I/F controller 10 notifies the processor 30 of the command. The host I/F controller 10 buffers the data received from the host 1 in a buffer memory 25 or transmits the data buffered in the buffer memory 25 to the host 1 according to control of the processor 30.

The RAM 20 includes a storage area as the buffer memory 25 for temporarily storing the data at the time of writing of write data from the host 1 to the magnetic disk 3. The buffer memory 25 temporarily stores the data when the data read from the magnetic disk 3 is transferred to the host 1. The buffer memory 25 has a function of a cache memory. The RAM 20 further includes a storage area for storing management information to manage the data. Firmware stored in the non-volatile memory 50 is deploy on the RAM 20. The management information managed on the RAM 20 is backed up on the non-volatile memory 50 or the magnetic disk 3. A static random access memory (SRAM) and a dynamic random access memory (DRAM) are used as the RAM 20.

The non-volatile memory 50 is formed of a flash memory, an EEPROM and the like in which the firmware executed by the processor 30 is stored.

The device I/F controller 40 writes the data to the magnetic disk 3 and reads the data from the magnetic disk 3 by performing drive control of the spindle motor 2, the magnetic head 4, and the head driving unit 6. The device I/F controller 40 includes an offtrack detector 41 and an ECC circuit 42. The offtrack detector 41 detects offtrack being a shift of the magnetic head 4 from a target position in a track width direction at the time of a write process to the magnetic disk 3. When the offtrack detector 41 detects the offtrack, the offtrack detector 41 notifies a retry processor 35 (refer to FIG. 3) to be described later of an offtrack amount.

The ECC circuit 42 is used for correcting the data read from the magnetic disk 3. The ECC circuit 42 performs an encoding process (for example, generation of an error correcting code) in an ECC process (error correcting process) to the data transferred from the buffer memory 25. The ECC circuit 42 also performs a decoding process (for example, error detecting and error correcting processes using the error correcting code) in the ECC process by using the data and the code read from the magnetic disk 3.

The processor 30 realizes its function by the firmware stored in the non-volatile memory 50. When the magnetic disk device 100 is activated, the firmware stored in the non-volatile memory 50 is loaded on the RAM 20. The processor 30 executes the firmware loaded on the RAM 20. The function performed by the processor 30 is to be described later.

When receiving a write command and the write data from the host 1 by the host I/F controller 10, the processor 30 analyzes contents of the write command and stores the write data in the buffer memory 25. Thereafter, the write data is read from the buffer memory 25 to be input to the device I/F controller 40. The device I/F controller 40 adds the code encoded by the ECC circuit 42 to the write data and drives a writing element of the magnetic head 4 by using the write data to write the write data to the magnetic disk 3. At the time of the writing, the device I/F controller 40 performs the drive control of the head driving unit 6 and the spindle motor 2 and writes to a target track indicated by the command.

In contrast, when receiving a read command from the host 1 by the host I/F controller 10, the processor 30 analyzes the read command. Thereafter, the processor 30 gives an instruction to the device I/F controller 40 based on the analysis. As a result, the magnetic head 4 is driven by the device I/F controller 40 and a signal is read by a reading element of the magnetic head 4. The read signal is demodulated as read data by the device I/F controller 40. Further, the read data is buffered in the buffer memory 25 after an error thereof is detected and corrected by the ECC process by the ECC circuit 42. Thereafter, the read data is transferred to the host 1 by the host I/F controller 10.

Figure 2A:
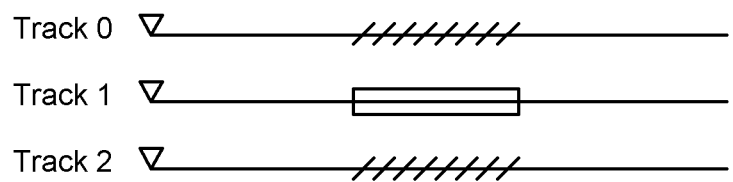
FIG. 2A is a schematic diagram for explaining adjacent track interference.

Adjacent track interference (ATI) is described with reference to FIG. 2A. When the writing is performed to a track 1 of the magnetic disk 3, a magnetic field affects adjacent tracks 0 and 2 to deteriorate the signal. Such a phenomenon is referred to as the ATI. A following process is performed as measures against the ATI.

The number of times of writing is managed for each track group. That is to say, all the tracks included in the magnetic disk 3 are divided into a plurality of track groups and a plurality of tracks is allowed to belong to one track group. The number of times of writing to a plurality of tracks belonging to the track group is counted and when a count value becomes larger than a predetermined slice value (threshold) D, refresh operation to a plurality of tracks belonging to the track group is performed. In the refresh operation, the data is read from each track of a target track group and the read data is written to each track.

Figure 2B:
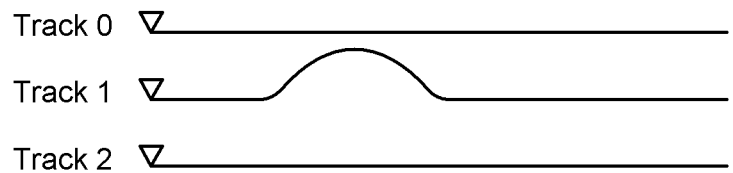
FIG. 2B is a schematic diagram for explaining close writing.

Close writing to the adjacent track is described with reference to FIG. 2B. When vibration and the like occur at the time of the writing to the track 1, the offtrack in which the magnetic head 4 gets close from a target position of the track 1 to a side of the track 0 occurs. The offtrack and the offtrack amount are detected by the offtrack detector 41. As measures against the close writing, slice values E different according to the offtrack amount are provided and different recovery processes are executed according to the offtrack amount.

Figure 2C:
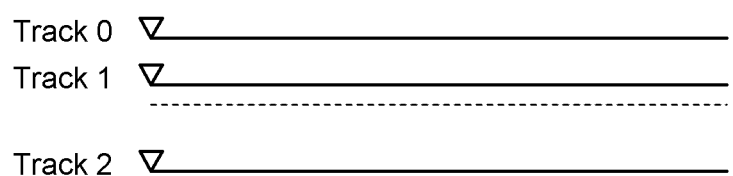
FIG. 2C is a schematic diagram for explaining pitch abnormality.

FIG. 2C illustrates the tracks in which a uniform track pitch cannot be maintained due to a narrow track pitch. The track 1 gets close to the track 0 and pitch abnormality in which the track pitch is narrower than that between other tracks occurs. Even when there is such underlying pitch abnormality, it is not possible to correct the pitch abnormality, so that it is required to use the device with the underlying pitch abnormality.

As the measures against the ATI, the number of times of writing is counted in each track group and the refresh operation is started when the count value becomes larger than the slice value D as described above. In a comparative example, a starting slice value D of the refresh operation is determined on the condition that the track pitch in the track group is constant. Therefore, a phenomenon that a quality of the track with the pitch abnormality starts deteriorating in an earlier stage than a normal track when there is variation in the track pitch is not taken into consideration.

As the measures against the close writing, the slice values E different according to the offtrack amount are provided and the different recovery processes are executed according to the offtrack amount. In the comparative example, the slice values for defining slight and severe two offtrack occurring states are provided and write retry operation is executed to the track in the slight state and a rewrite to the adjacent track is executed in the severe state. However, the measures against the close writing in the comparative example are determined on the condition that the track pitch is constant and the variation in the track pitch is not taken into consideration. Therefore, a slight or smaller offtrack amount might have an effect equivalent to that of a severe offtrack amount on the track with the pitch abnormality.

Therefore, in the measures against the close writing in this embodiment, the slice values defining slight, moderate, and severe three states are provided and different types of operation are executed for the three states.

In the measures against the ATI in this embodiment, it is configured that count operation is performed such that an addition value per writing becomes larger in the order of slight, moderate, and severe at the time of count of the number of times of writing in each track group. For example, an addition multiplying factor value is set such that the addition value per writing becomes larger in the order of slight, moderate, and severe. According to this, the count value arrives at a predetermined slice value D sooner as the offtrack amount becomes more serious from slight, moderate to severe and the refresh operation is performed sooner.

According to this, in this embodiment, rapid deterioration in track quality due to the track pitch abnormality is prevented and the data is secured for a longer period of time.

Figure 3:
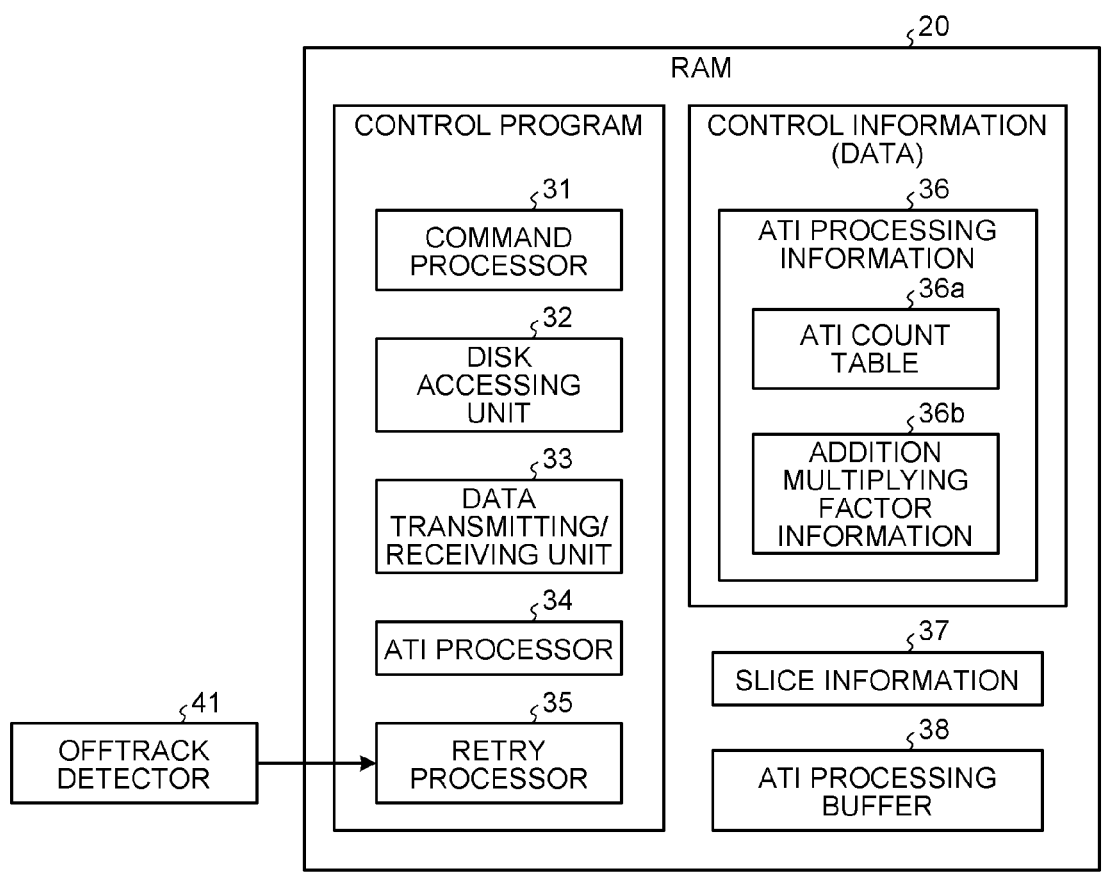
FIG. 3 is a view of a functional configuration example of a controller.

FIG. 3 is a block diagram of a functional configuration example of the firmware deployed on the RAM 20. A control program includes a command processor 31, a disk accessing unit 32, a data transmitting/receiving unit 33, an ATI processor 34, and a retry processor 35 and serves as a controller of the magnetic disk device 100. The command processor 31 analyzes the command received from the host 1 and notifies the disk accessing unit 32 and the data transmitting/receiving unit 33 of an analysis result. The disk accessing unit 32 controls the device I/F controller 40 based on the analysis result of the command, thereby driving the spindle motor 2, the magnetic head 4, and the head driving unit 6 to perform read/write operation to the magnetic disk 3. The disk accessing unit 32 executes an update process of the management information with the write operation to the magnetic disk 3. The data transmitting/receiving unit 33 controls the host I/F controller 10 and the device I/F controller 40 to control the data transfer between the magnetic disk 3 and the host 1 through the buffer memory 25.

The retry processor 35 determines a level of the offtrack, in other words, a degree or a rank of the offtrack by using slice information 37a of the offtrack when a detection signal of the offtrack and the offtrack amount are input from the offtrack detector 41. A plurality of slice values E1 and E2 for classifying the degree of the offtrack into slight, moderate, and severe three ranks is set as the slice information 37a of the offtrack. The retry processor 35 compares the offtrack amount with the slice values E1 and E2 and classifies the offtrack amount into the slight, moderate, and severe three ranks based on a comparison result. Then, the retry processor 35 executes the different processes based on the classification result.

FIG. 4 illustrates retry processes according to the levels of the offtrack: the processes are performed by the retry processor 35.

(a) When the offtrack is not detected, the retry process is not performed.

(b) When the level of the offtrack is slight, the write retry to the write target track is performed.

(c) When the level of the offtrack is moderate, the write retry to the write target track is performed and the reading for verifying the data of the adjacent track is performed. The different recovery processes are performed according to a success level of the verification.

(d) When the level of the offtrack is severe, the write retry to the write target track is performed and the data of the adjacent track is written to another track.

The ATI processor 34 executes the process as the measures against the ATI by using ATI processing information 36. The ATI processor 34 buffers the data read from the magnetic disk 3 by using an ATI processing buffer 38 at the time of the refresh operation as the process as the measures against the ATI. The ATI processing information 36 includes an ATI count table 36a and addition multiplying factor information 36b.

In the ATI count table 36a, the number of times of writing is managed in each track group as illustrated in FIG. 5. As described above, all the tracks included in the magnetic disk 3 are divided into a plurality of track groups and a plurality of tracks is allowed to belong to one track group. When the writing to the magnetic disk 3 occurs, the ATI processor 34 counts the number of times of writing in each track group, adds the count value to a current registered value of the ATI count table 36a, and updates the registered value (current value) of the ATI count table 36a with an addition result.

A plurality of addition multiplying factors A, B, and C by which the addition value per writing becomes larger in the order of slight, moderate, and severe offtrack levels when the number of times of writing is counted in each track group are registered in advance in the addition multiplying factor information 36b as illustrated in FIG. 6. Supposing that the addition multiplying factor when the offtrack is not detected is set to 1, and the addition multiplying factors when the offtrack level is slight, moderate, and severe are set to A, B, and C, respectively, $1<A<B<C$ is satisfied. That is to say, it is calculated as the number of times of writing in each track group=the current registered value of the ATI count table 36a+the number of times of writing at the time of current write operation×addition multiplying factor.

Therefore, contribution to addition per writing becomes larger in the order of slight, moderate, and severe. Therefore, when the number of times of offtrack is the same, it arrives at the slice value D for starting the refresh operation sooner in the severe level than in the slight or moderate level. Alternatively, even when the number of times of severe offtrack is smaller than the number of times of slight or moderate offtrack, it arrives at the slice value D sooner when the offtrack is severe than when the offtrack is slight or moderate. Therefore, when the offtrack level is severe, the refresh operation is executed sooner than when the level is slight or moderate. Meanwhile, the moderate addition multiplying factor B is further divided into B1, B2, and B3 as described later ($B1<B2<B3$).

Figure 7:
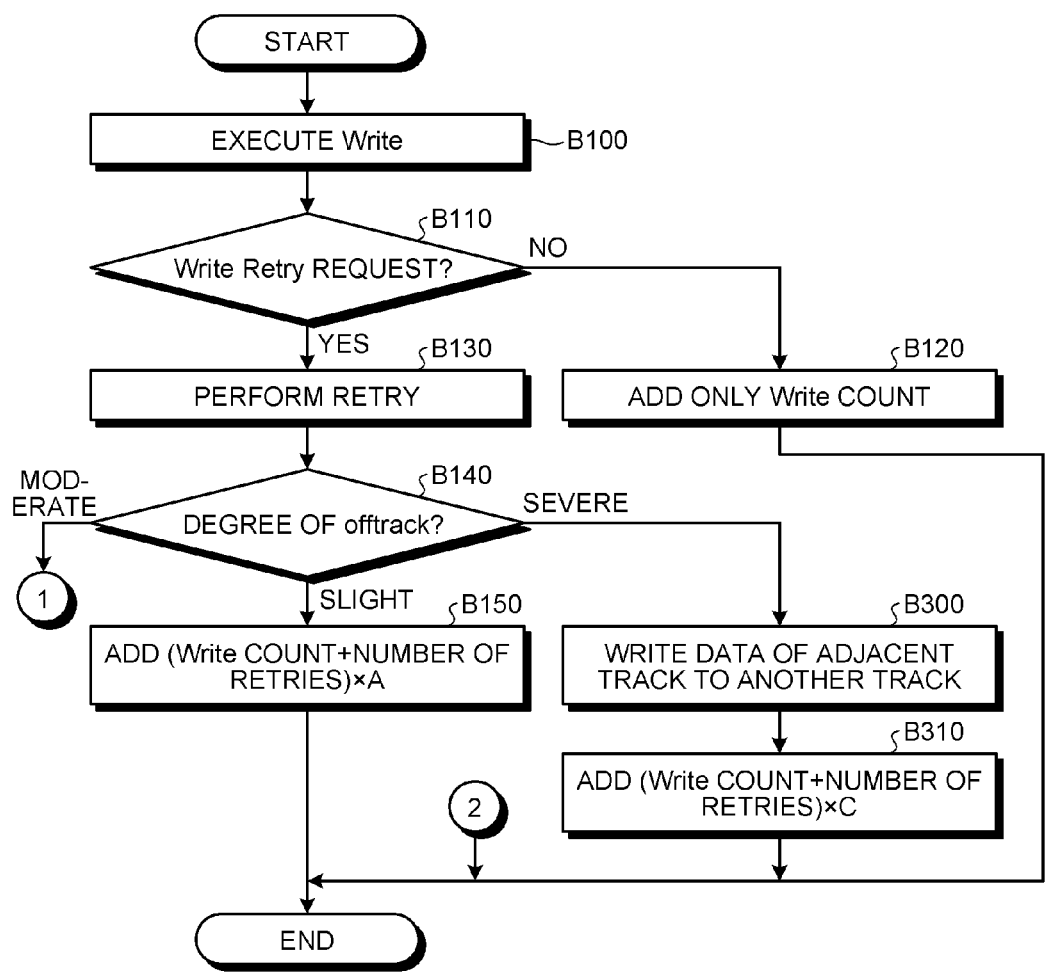
FIG. 7 is a flowchart of an operation procedure of a first embodiment.
Figure 8:
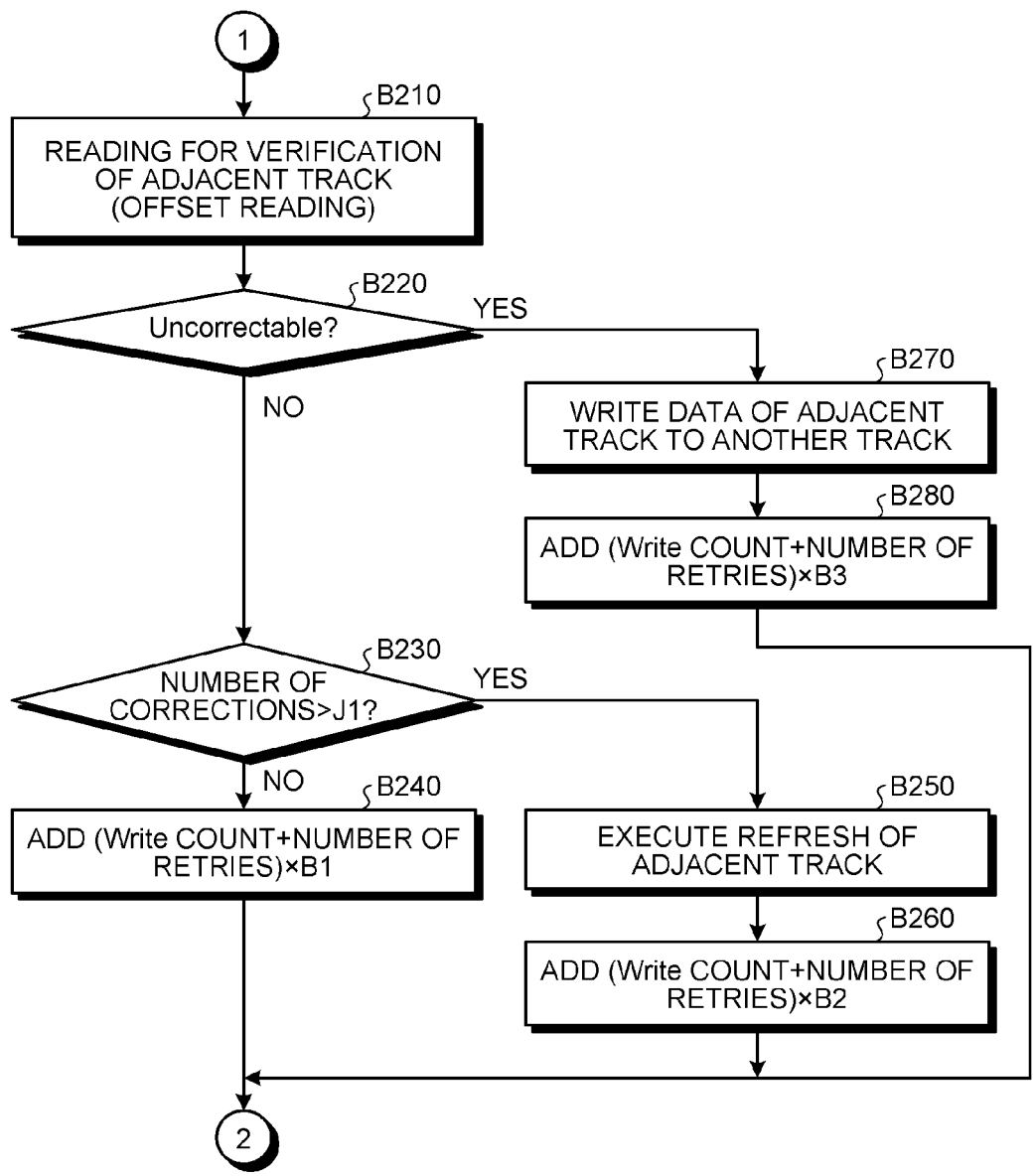
FIG. 8 is a flowchart of the operation procedure of the first embodiment.

FIGS. 7 and 8 are flowcharts of a procedure performed by the ATI processor 34 and the retry processor 35. When the write operation to the magnetic disk 3 is performed (block B100), the offtrack detector 41 detects whether the offtrack occurs during the write operation and notifies the retry processor 35 of a detection result and the offtrack amount. The retry processor 35 determines whether there is a write retry request from the offtrack detector 41 (block B110). The retry processor 35 does not perform the retry process when the retry processor 35 is notified by the offtrack detector 41 that the offtrack is not detected yet and the write retry request is not generated (block B110: No), and notifies the ATI processor 34 that the offtrack is not detected yet. The ATI processor 34 counts the number of writing of the write operation to a current track and adds a count result to a current count value (current registered value) of the track group to which the track in question belongs of the ATI count table 36a to update an entry of the corresponding track group of the ATI count table 36a with the addition result (block B120).

When the offtrack detector 41 detects the offtrack, the offtrack detector 41 notifies the retry processor 35 of the retry request and the offtrack amount. When the retry processor 35 is notified by the offtrack detector 41 of the retry request (block B110: Yes), the retry processor 35 executes the write retry to a current write target track in which the offtrack is detected (block B130). The write retry operation is repeatedly performed until the offtrack detector 41 no longer detects the offtrack. There is a maximum value of the number of times of retry. The offtrack detector 41 notifies the retry processor 35 of the offtrack amount each time the retry is performed. The retry processor 35 comprehensively determines the offtrack level from the offtrack amount at the time of first write operation and one or a plurality of offtrack amounts at the time of the write retry operation (block B140). For example, the offtrack level of the track in question may be determined by using a worst value (maximum value) of the offtrack amounts at the time of a plurality of times of write operation or determined from an average value of the offtrack amounts at the time of a plurality of times of write operation.

For example, if the offtrack occurs at the time of the first write operation and next retry operation is normally finished, the offtrack level is determined based on the offtrack amount at the time of the first writing. When the offtrack occurs at the time of the first write operation, the offtrack occurs at the time of first retry operation, and second retry operation is normally finished, the offtrack level is determined by using the worst value (maximum value) of the offtrack amounts at the time of the first write operation and the first retry operation. Meanwhile, when the write operation cannot be normally finished as a result of the maximum number of times of retry, this track is hereinafter managed as an error track and the data is written to another track.

The retry processor 35 compares the offtrack amount with the slice values E1 and E2 registered in the slice information 37a to determine whether the offtrack level is slight, moderate, or severe (block B140).

When it is determined that the slight-level offtrack occurs at the time of writing to the current write target track (block B140: slight), the retry processor 35 notifies the ATI processor 34 of occurrence of the slight-level offtrack after the retry operation at block B130. The ATI processor 34 counts the number of times of writing to the current write target track. The count value is a total value F of the first write operation and one or a plurality of times of write operation at the time of the retry operation. The ATI processor 34 obtains the addition multiplying factor A of the slight level from the addition multiplying factor information 36b, multiplies the addition multiplying factor A by the total counted number of times F, adds a multiplication result to the current count value of the track group to which the track in question belongs of the ATI count table 36a, and updates the entry of the corresponding track group of the ATI count table 36a with the addition result (block B150).

When it is determined that the severe-level offtrack occurs at the time of the writing to the current write target track (block B140: severe), the retry processor 35 performs data movement to write the data of the track adjacent to the write target track to another track after the retry operation at block B130 (block B300). That is to say, the retry processor 35 reads the data of the adjacent track, buffers the same in the buffer memory 25, and writes the buffered read data to another track of the magnetic disk 3. Meanwhile, although there are two tracks adjacent to the write target track, the data movement is executed to the track closer to the offtrack.

Also, in this case, the retry processor 35 notifies the ATI processor 34 of the occurrence of the severe-level offtrack. The ATI processor 34 obtains the addition multiplying factor C of the severe level from the addition multiplying factor information 36b, multiplies the addition multiplying factor C by the total counted number of times F of the first write operation and the write operation at the time of the retry operation, adds the multiplication result to the current count value of the track group to which the track in question belongs of the ATI count table 36a, and updates the entry of the corresponding track group of the ATI count table 36a with the addition result (block B310).

When it is determined that the moderate-level offtrack occurs at the time of the writing to the current write target track (block B140: moderate), the retry processor 35 reads the data of the track adjacent to the write target track for verification after the retry operation at block B130 (FIG. 8: block B210). Although there are two tracks adjacent to the write target track, verification reading is executed to the track closer to the offtrack.

At the time of the verification reading to the adjacent track, the magnetic head 4 is located in a position with an offset in a direction toward the write target track from a central position of the adjacent track (so as to be closer) to execute the read operation (block B210). The offset amount at that time is set such that the reading may be performed if the track pitch is normal. According to such an offset process, possibility of an error by the verification reading is increased when there is track pitch abnormality and the adjacent track being a target of the verification reading and the write target track are closer to each other than usual, so that it becomes possible to detect narrow pitch abnormality more accurately.

The error detection and error correction of the read data of the adjacent track are performed by the ECC circuit 42. The ECC circuit 42 performs the error detection and error correction and notifies the retry processor 35 of a result of the error correction. For example, the ECC circuit 42 determines whether the error of the read data of the adjacent track may be corrected (block B220). The retry processor 35 classifies an error level (verification level) of the error detection and error correction performed by the ECC circuit 42 into three levels (first, second, and third levels) and executes the different recovery processes according to the three levels. In this case, as the moderate addition multiplying factor B registered in the addition multiplying factor information 36b, a first-level addition multiplying factor=B1, a second-level addition multiplying factor=B2, and a third-level addition multiplying factor=B3 are registered in advance so as to correspond to the error levels of the error correction (B1<B2<B3).

When the error of the read data of the adjacent track may be corrected (block B220: No), the ECC circuit 42 determines whether the number of errors is smaller than a threshold J1 (block B230) and notifies the retry processor 35 of a determination result. When the number of error corrections is not larger than the threshold J1 (block S230: No), the retry processor 35 notifies the ATI processor 34 that an ATI process level of the track in question is the first level of the moderate level. The ATI processor 34 obtains the addition multiplying factor B1 of the moderate first level from the addition multiplying factor information 36b, multiplies the addition multiplying factor B1 by the total counted number of times F of the first write operation and the write operation at the time of the retry operation, adds the multiplication result to the current count value of the track group to which the track in question belongs of the ATI count table 36a, and updates the entry of the corresponding track group of the ATI count table 36a with the addition result (block B240).

When the retry processor 35 is notified by the ECC circuit 42 of the determination result in which the number of error corrections is larger than the threshold J1 by the determination at block B230 (block S230: Yes), the retry processor 35 executes the refresh of the adjacent track (block B250). That is to say, the retry processor 35 writes the data after the error correction obtained by the error correction by the ECC circuit 42 to the adjacent track. The retry processor 35 notifies the ATI processor 34 that the ATI process level of the track in question is the moderate second level. The ATI processor 34 obtains the addition multiplying factor B2 of the second level of the moderate level from the addition multiplying factor information 36b, multiplies the addition multiplying factor B2 by the total counted number of times F of the first write operation and the write operation at the time of the retry operation, adds the multiplication result to the current count value of the track group to which the track in question belongs of the ATI count table 36a, and updates the entry of the corresponding track group of the ATI count table 36a with the addition result (block B260). Meanwhile, when the adjacent track is included in the track group in question, the number of times of current writing including the number of times of writing to the adjacent track is counted.

When the retry processor 35 is notified by the ECC circuit 42 that the error of the read data of the adjacent track cannot be corrected (block B220: Yes), the retry processor 35 performs the data movement to write the data of the track adjacent to the write target track to another track (block B270). The retry processor 35 notifies the ATI processor 34 that the ATI process level of the track in question is the moderate third level. The ATI processor 34 obtains the addition multiplying factor B3 of the third level of the moderate level from the addition multiplying factor information 36b, multiplies the addition multiplying factor B3 by the total counted number of times F of the first write operation and the write operation at the time of the retry operation, adds the multiplication result to the current count value of the track group to which the track in question belongs of the ATI count table 36a, and updates the entry of the corresponding track group of the ATI count table 36a with the addition result (block B280). Meanwhile, when a destination track of the data of the adjacent track is included in the track group in question, the number of times of current writing including the times of writing to the destination track is counted.

Meanwhile, in an ATI count process illustrated in FIG. 8, the addition multiplying factors are set such that the moderate first level=B1, the moderate second level=B2, and the moderate third level=B3 (B1<B2<B3), it is also possible that B2=B3. Further, it is also possible to set such that the addition multiplying factor B3 of the moderate third level=the severe addition multiplying factor C.

Also, as described above, the ATI processor 34 counts the number of times of writing in each track group and starts the refresh operation when the counted number of times of writing becomes larger than the slice value D. In the refresh operation, after the data of each track in the track group is read, the error thereof is corrected by the ECC circuit 42, and then the data after the error correction is buffered in the ATI processing buffer 38. The data after the error correction buffered in the ATI processing buffer 38 is written to each track of an original track group. After rewrite operation is completed, the entry of the corresponding track group of the ATI count table 36*a* is reset to 0.

In this manner, in the first embodiment, the offtrack level is classified into slight, moderate, and severe, the write retry to the write target track is performed in the slight level, the reading is performed for verifying the data of the adjacent track after the write retry to the write target track is performed in the moderate level, and the data of the adjacent track is written to another track after the write retry to the write target track is performed in the severe level. Therefore, in the first embodiment, a more appropriate process according to the offtrack level is performed.

In the first embodiment, it is configured such that the count operation is performed such that the addition value per writing becomes larger in the order of slight, moderate, and severe at the time of count of the number of times of writing in each track group. According to this, the count value arrives at a predetermined slice value D sooner as the offtrack amount becomes more serious from slight, moderate to severe, and the refresh operation is performed sooner.

According to this, the rapid deterioration in the track quality due to the track pitch abnormality is prevented and the data is secured for a longer period of time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic head;
    a magnetic disk corresponding to the magnetic head; and
    a controller configured to write data to the magnetic disk with the magnetic head, wherein
    the controller detects an amount of offtrack occurring at the time of writing to a write target track, and executes any of
    a first process to perform a write retry to the write target track,
    a second process to perform the write retry to the write target track and perform reading for data verification to an adjacent track adjacent to a side on which the offtrack occurs at the time of the writing to the write target track, and
    a third process to perform the write retry to the write target track and write data of the adjacent track to another track,
    based on a result of comparison between the detected offtrack amount and a plurality of different slice values, and wherein
    the controller counts the number of times of writing to the write target track such that an addition value per writing becomes larger in the order of the first process, the second process, and the third process and executes a refresh process to read and rewrite the data of a track in which the counted number of times of writing exceeds a predetermined slice value.

2. The magnetic disk device according to claim 1, wherein the controller divides the magnetic disk into a plurality of track groups, each of the track groups including a plurality of track, and manages the number of times of writing in each track group.

3. The magnetic disk device according to claim 1, wherein the controller performs the reading for the data verification to a position with an offset in a direction toward the write target track from a central position of the adjacent track in the second process.

4. The magnetic disk device according to claim 1, wherein the controller performs a recovery process of the adjacent track based on a success level of the verification of read data in the second process.

5. The magnetic disk device according to claim 4, wherein the controller executes, as the recovery process, any of
    a fourth process in which the writing to the write target track and the adjacent track is not performed,
    a fifth process to perform the refresh process to read and rewrite the data of the adjacent track, and
    a sixth process to write the data of the adjacent track to another track.

6. The magnetic disk device according to claim 5, wherein the controller executes the count operation such that an addition value per writing when the fourth process is performed becomes smaller than an addition value per writing when the fifth process is performed.

7. The magnetic disk device according to claim 5, wherein the controller executes the count operation such that an addition value per writing when the fifth process is performed becomes smaller than an addition value per writing when the sixth process is performed.

8. The magnetic disk device according to claim 5, wherein the controller executes the count operation such that an addition value per writing when the fifth process is performed becomes the same as an addition value per writing when the sixth process is performed.

9. A control method of a magnetic disk device comprising a magnetic head and a magnetic disk corresponding to the magnetic head, the control method comprising:
    detecting an amount of offtrack occurring at the time of writing to a write target track;
    executing any of
    a first process to perform a write retry to the write target track,
    a second process to perform the write retry to the write target track and perform reading for data verification to an adjacent track adjacent to a side on which the offtrack occurs at the time of the writing to the write target track, and
    a third process to perform the write retry to the write target track and write data of the adjacent track to another track,
    based on a result of comparison between the detected offtrack amount and a plurality of different slice values;
    counting the number of times of writing to the write target track such that an addition value per writing becomes larger in the order of the first process, the second process, and the third process; and executing a refresh process to read and rewrite the data of a track in which the counted number of times of writing exceeds larger than a predetermined slice value.

10. The control method of the magnetic disk device according to claim 9 further comprising:

dividing the magnetic disk into a plurality of track groups, each of the track groups including a plurality of track; and managing the number of times of writing in each track group.

11. The control method of the magnetic disk device according to claim 9 comprising:

performing the reading for the data verification to a position with an offset in a direction toward the write target track from a central position of the adjacent track in the second process.

12. The control method of the magnetic disk device according to claim 11, wherein a recovery process of the adjacent track is performed based on a success level of the verification of read data in the second process.

13. The control method of the magnetic disk device according to claim 12 comprising:

executing, as the recovery process, any of a fourth process in which the writing to the write target track and the adjacent track is not performed, a fifth process to perform the refresh process to read and rewrite the data of the adjacent track, and a sixth process to write the data of the adjacent track to another track.

14. The control method of the magnetic disk device according to claim 13 comprising:

executing the count operation such that an addition value per writing when the fourth process is performed becomes smaller than an addition value per writing when the fifth process is performed.

15. The control method of the magnetic disk device according to claim 13 comprising:

executing the count operation such that an addition value per writing when the fifth process is performed becomes smaller than an addition value per writing when the sixth process is performed.

16. The control method of the magnetic disk device according to claim 13 comprising:

executing the count operation such that an addition value per writing when the fifth process is performed becomes the same as an addition value per writing when the sixth process is performed.

17. A magnetic disk device comprising:

a magnetic head;

a magnetic disk corresponding to the magnetic head; and a controller configured to write data to the magnetic disk with the magnetic head, wherein the controller detects an amount of offtrack occurring at the time of writing to a write target track, and executes any of a first process to perform a write retry to the write target track, a second process to perform the write retry to the write target track and perform reading for data verification to an adjacent track adjacent to a side on which the offtrack occurs at the time of the writing to the write target track, and a third process to perform the write retry to the write target track and write data of the adjacent track to another track, based on a result of comparison between the detected offtrack amount and a plurality of different slice values, and wherein the controller performs the reading for the data verification to a position with an offset in a direction toward the write target track from a central position of the adjacent track in the second process.

\* \* \* \* \*